H. J. COHN.
ANTISKID DEVICE.
APPLICATION FILED JULY 7, 1922.

1,437,093.

Patented Nov. 28, 1922.

H. J. Cohn, Inventor

By C. A. Snow & Co.
Attorney

Patented Nov. 28, 1922.

1,437,093

UNITED STATES PATENT OFFICE.

HENRY J. COHN, OF RICHMOND, VIRGINIA.

ANTISKID DEVICE.

Application filed July 7, 1922. Serial No. 573,279.

*To all whom it may concern:*

Be it known that I, HENRY J. COHN, a citizen of the United States, residing at Richmond, in the county of Henrico and State of Virginia, have invented a new and useful Antiskid Device, of which the following is a specification.

This invention relates to anti-skid devices for motor vehicle wheels, the primary object of the invention being to provide an anti-skid device including a plurality of independent chain sections and supporting sections, the chain sections being secured to the supporting sections in a manner to permit of easy adjustment of the chains with respect to the supporting sections.

Another object of the invention is to provide a device of this character including removable chain sections, wherein the number of chain sections may be increased or diminished to meet road conditions.

A still further object of the invention is to provide a connection between the chain sections and supporting sections to equalize the strain directed to the sections and eliminate any possibility of one of the supporting sections becoming distorted or rendered inoperative, by receiving the entire strain of the anti-skid chains.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
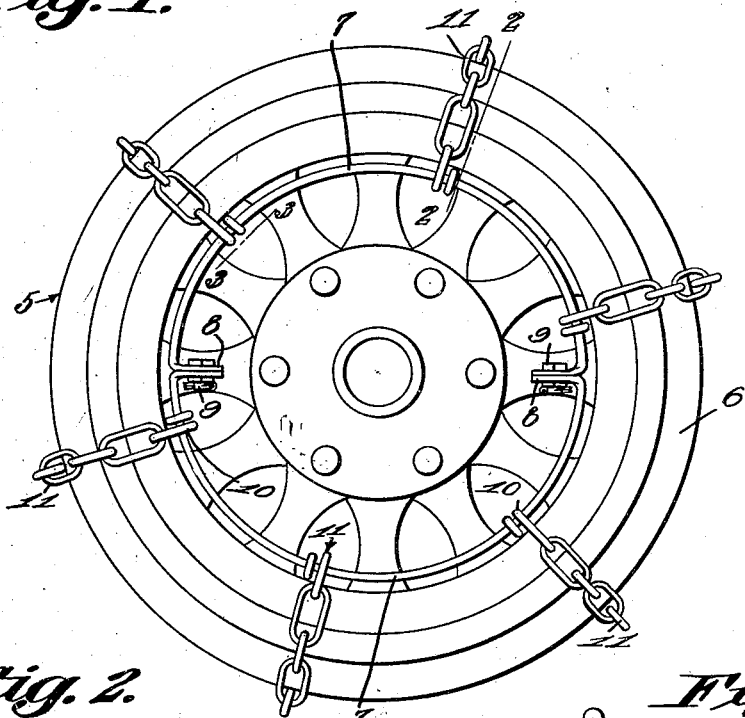
Figure 1 is a side elevational view of a wheel of a motor vehicle disclosing an antiskid device constructed in accordance with the invention, as applied thereto.

Referring to the drawing in detail, the reference character 5 designates a motor vehicle wheel, the same being supplied with the usual tire 6.

The device embodies supporting sections 7, each of which being in the form of a semicircular rod having right angled extremities 8, the right angled extremities of the adjacent sections adapted to be brought together and bolted, as by means of the bolts 9, securing the sections in their proper positions and providing a circular supporting element. As shown, these supporting elements are positioned at opposite sides of the wheel and are disposed in proximity to the inner surface of the felloe thereof.

The chain sections 11 which form an important feature of the invention, include a plurality of links, the sizes thereof being varied according to the size and weight of the wheel to which the anti-skid device is applied.

Figures 2, 3:
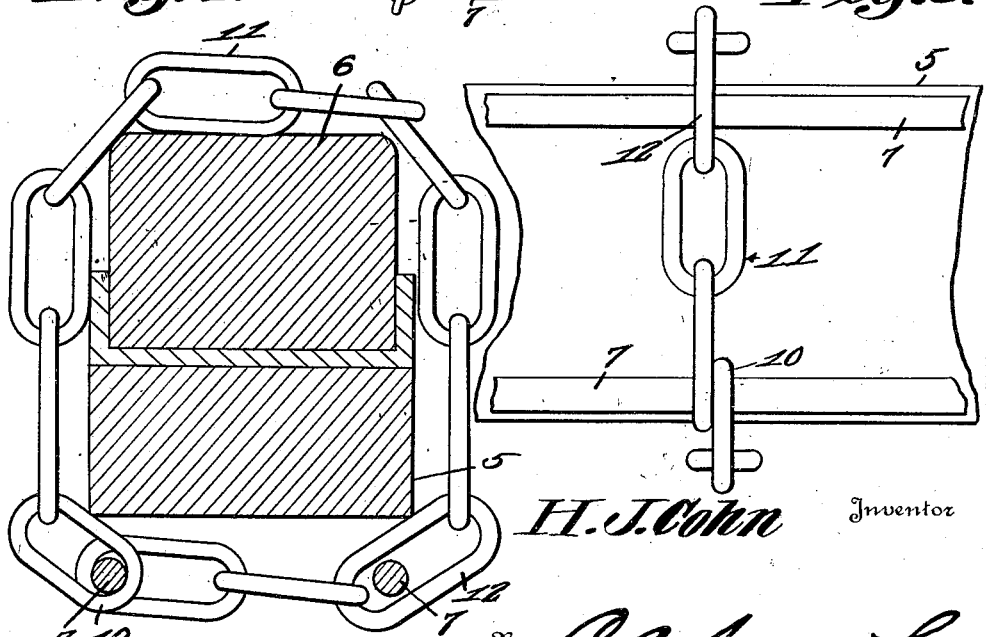
Figure 2 is a sectional view taken on line 2—2 of Figure 1.
Figure 3 is an enlarged sectional view taken on line 3—3 of Figure 1.

Each of these chain sections is secured to the wheel by passing one end link as indicated at 10 over one of the semi-circular sections prior to the securing of the ends of the semi-circular sections together, the intermediate portion of the section overlying the tread of the tire while one of the links adjacent to the opposite end of the chain section is passed over the opposed supporting element at the opposite side of the wheel as shown at 12, the link at this end of the chain being passed over the same supporting element as the first mentioned link of the section, as clearly shown by Figure 3 of the drawing.

It might be further stated that portions of the chain sections lie between adjacent spokes of the wheel to prevent creeping of the chain sections when brought into use.

From the foregoing it will be seen that the chain sections 11 may be added to the wheel when the vehicle is moved through exceptionally muddy surfaces, but when it is only desired to prevent skidding of the wheel on wet surfaces, a lesser number of chain sections may be used, relieving the remaining chain sections of unnecessary wear.

Having thus described the invention, what is claimed as new is:

1. An anti-skid device including opposed supporting elements, each of the supporting elements comprising semi-circular sections, means for securing the sections together, removable chain sections, each of the chain sections having one of its end links passed over one of the supporting elements, the intermediate portion thereof passing over the tread of the wheel to which the device is applied and having one of the links passed over the opposed supporting element, and having its opposite end link passed over the first supporting element.

2. An anti-skid device including opposed supporting elements, a plurality of chain sections, each of the chain sections having its end links passed over one of the supporting elements, and each chain section having a link intermediate the ends thereof passed over the opposed supporting element.

3. An anti-skid device including opposed supporting elements, said supporting elements adapted to lie in proximity to the felloe of a wheel to which the device is secured, chain sections, said sections having links adapted to be passed over the supporting elements, and portions of the chain sections adapted to lie between adjacent spokes of the wheel to which the device is secured.

In testimony that I claim the foregoing as my own, I have hereto affixed my signature in the presence of two witnesses.

HENRY J. COHN.

Witnesses:
R. T. BRAY,
R. F. WILTSHIRE.